United States Patent [19]
Ochi et al.

[11] Patent Number: 5,601,911
[45] Date of Patent: Feb. 11, 1997

[54] CAPSULE TYPE RETROREFLECTIVE SHEETING

[75] Inventors: Katsura Ochi, Kazo; Osamu Tanaka; Manabu Ogawa, both of Sano, all of Japan

[73] Assignee: Nippon CarbideKogyo Kabushiki Kaisha, Tokyo, Japan

[21] Appl. No.: 587,760

[22] Filed: Nov. 22, 1995

[30] Foreign Application Priority Data

Nov. 24, 1994 [JP] Japan .................................. 6-312339

[51] Int. Cl.⁶ ...................................... B32B 3/26
[52] U.S. Cl. ..................... 428/304.4; 428/308.4; 428/310.5; 428/411.1; 428/447; 428/474.4; 428/480; 428/500; 428/524; 428/913
[58] Field of Search ............... 156/247; 428/195, 428/913, 914, 411.1, 323, 402, 474.4, 480, 488.4, 304.4, 308.4, 310.5, 447, 500, 524

[56] References Cited

U.S. PATENT DOCUMENTS

| | | |
|---|---|---|
| 4,025,159 | 5/1977 | McGrath . |
| 4,530,859 | 7/1985 | Grunzinger, Jr. .................... 427/385.5 |
| 4,637,950 | 1/1987 | Bergeson et al. ...................... 428/168 |
| 4,653,854 | 3/1987 | Miyata . |
| 4,721,649 | 1/1988 | Belisle et al. ............................ 428/325 |
| 4,725,494 | 2/1988 | Belisle et al. ............................ 428/325 |
| 4,844,976 | 7/1989 | Huang ..................................... 428/323 |
| 4,897,136 | 1/1990 | Bailey et al. . |
| 5,008,142 | 4/1991 | Wilson et al. ........................... 428/203 |
| 5,064,272 | 11/1991 | Bailey et al. . |
| 5,073,404 | 12/1991 | Huang ....................................... 427/39 |
| 5,256,721 | 10/1993 | Wilson et al. ........................... 524/539 |

FOREIGN PATENT DOCUMENTS

| | | |
|---|---|---|
| 0225103 | 6/1987 | European Pat. Off. . |
| 2706589 | 8/1977 | Germany . |
| 60-194405 | 10/1985 | Japan . |
| 61-13561 | 4/1986 | Japan . |
| 62-121043 | 6/1987 | Japan . |
| 2156274 | 10/1985 | United Kingdom . |

*Primary Examiner*—William Krynski
*Attorney, Agent, or Firm*—Sherman and Shalloway

[57] ABSTRACT

This invention provides a capsule type retroreflective sheeting excelling in strength and longterm weatherability, the connecting walls, which partially connect the light-transmitting protective film and support film while retaining the spaces between the two films, being free of internal flaws such as deficiently filled portions and having uniform structure and shape. The capsule type retroreflective sheeting in which the connecting walls are formed by partially thermofusing and thermoforming the support film is characterized in that the support film is composed of a resin composition which contains a thermofusible rein and a crosslinking agent, said thermofusible resin having a shearing stress at 180° C. within a range of $9 \times 10^3 \times 1 \times 10^5$ dyne/cm², and which can form a non-fusible crosslinked resin having a shearing stress at 180° C. of at least $1 \times 10^6$ dyne/cm² after the crosslinkage.

25 Claims, 1 Drawing Sheet

CAPSULE TYPE RETROREFLECTIVE SHEETING

BACKGROUND OF THE INVENTION

1. Field of the Invention

This invention relates to a capsule type retroreflective sheeting excelling in various physical properties such as long-term weatherability, which is useful for signs such as roadsigns and construction signs; number plates on vehicles such as automobiles and motorcycles; safety goods such as safety cloths and survival equipment, marking on signboards, and the like.

2. Description of the Prior Art

Retroreflective sheetings which retroreflex light towards the light source are well known in the past. Utilizing their retroreflectivity, the sheetings have been widely used in the field of utilization as above. In particular, capsule type retroreflective sheetings whose light-retroreflective performance is enhanced by sealing a gas in the spaces formed by a light-transmitting protective film, a support film and the joint portions connecting said two films, utilizing low refractive index of the gas, are finding yearly increasing utility because of their excellent light-retroreflective performance.

Capsule type retroreflective sheetings generally include two types of the products: one is encapsulated lens-type retroreflective sheetings in which lens-type retroreflective elements are disposed, and the other, encapsulated cube-corner type retroreflective sheetings in which cube-corner type retroreflective elements are disposed.

BRIEF DESCRIPTION OF THE DRAWINGS

As illustrated in FIG. 1, an encapsulated lens-type retroreflective sheeting is generally composed of a light transmitting protective film (1) and a support film (2), which face each other across a narrow gas layer, and continuous linear connecting walls (3) for binding said two films, said walls being formed by partially thermofusing and thermoforming the support film, and a large number of sealed small compartment cells (4) surrounded by said walls and said two films containing a substantially monolayer of glass beads (6), whose approximately lower hemispheres are coated with vacuum-deposited metal membrane (5) which is the light-reflective membrane, as embedded in the support film by their lower hemispheres.

As illustrated in FIG. 2, generally an encapsulated cube-corner type is retroreflective sheeting is composed of a light-transmitting protective film (7) and a support film (9) which face with each other across a narrow gas layer, and continuous linear connecting walls (10) to bind said two films, said walls being formed by partially thermofusing and thermoforming said support film, a large number of sealed small compartment cells (11) being surrounded by said connecting walls and said two films, and cube-corner type retroreflective element (8) being uniformly and densely disposed over the whole surface of the light-transmitting protective film in the cells.

Figure 1:
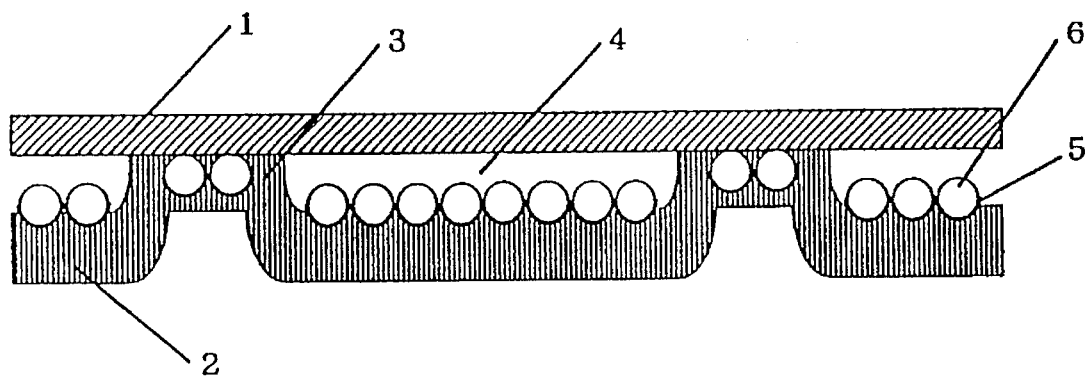
FIG. 1 shows a typical cross-sectional structure of an encapsulated lens-type retroreflective sheeting.
Figure 2:
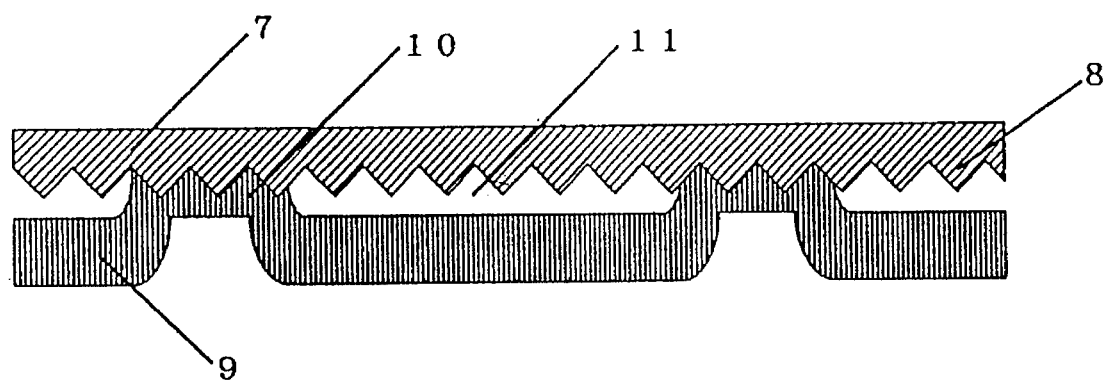
FIG. 2 shows a typical cross-sectional structure of an encapsulated cube-corner type retroreflective sheeting.

Such capsule type retroreflective sheetings are desired to exhibit high retroreflective performance as their most important function. They are furthermore required to have excellent weatherability enabling them to maintain the high retroreflective performance over a long term even with use under severe conditions as encountered in outdoor use or the like, and to have clear colors to enhance their perceptibility, as their significant functions.

Deterioration in retroreflective performance of capsule type retroreflective sheetings during their prolonged use in open air is caused in most cases by destruction of the sealed compartment cells and infiltration of rain water or the like thereinto. For instance, the repetitive expansion-contraction cycles of the gas sealed in the air tight small compartment cells or extension-shrinkage cycles of the materials such as metal plates onto which the retroreflective sheeting are adhered, accompanying the open air temperature variation, which tend to cause cracks in the protective film; disconnection occurring at the interfaces of the protective film and the connecting walls; breakdown of the connecting walls or support film per se; lead to loss of airtightness of the sealed small compartment cells to allow infiltration of rain warer or the like thereinto. This in turn is apt to cause fluctuation in such important factor of retroreflective performance as refractive indices. Furthermore, for example, in encapsulated lens-type retroreflective sheetings, deterioration of the light-reflective, vapor-coated metal membrane may be caused and its photoreflection ability may be lost, leading to deterioration in retroreflective performance.

In particular, the connecting walls binding the protective film and the support film are most susceptible to the effects of strain because of their construction, and are apt to be the easiest to be broken. In fact, deterioration of retroreflective sheetings and reduction in retroreflective performance caused by destruction of connecting walls have frequently occurred. Hence, it is most important for the improvement in weatherability of retroreflective sheetings to form the connecting walls having high strength.

In order for forming the connecting walls of high strength, it is naturally important to increase strength of the connecting walls themselves. Whereas, it is equally important to form the connecting walls of uniform structure free of defective portions, in the occasion of constructing said walls by partial thermofusing and thermoforming of the support film.

For example, in the production of an encapsulated lens-type retroreflective sheeting, in the process of partially thermofusing and thermoforming the support film to construct the connecting walls, the molten part of the support film flows through the spaces among the lenses embedded in its surface, while filling said spaces, to come to contact with the protective film to construct the connecting walls. In that occasion, insufficient flowability of the molten part of the support film leads to formation of such connecting walls which are not uniform in structure or shape, e.g., having faultily filled portions. Such connecting walls exhibit very unsatisfactory strength only.

Again, in production of an encapsulated cube-corner type retroreflective sheeting, in the process of partially thermofusing and thermoforming the support film to construct the connecting walls, the molten part of the support film flows into the spaces among the cube-corner type retroreflective elements which are uniformly and densely disposed on the back of the protective film and fills said spaces to form the connecting walls. If flowability of the molten part of the support film is insufficient in that occasion, the connecting walls come to have a non-uniform structure, e.g., forming defectively filled portions at the interfaces with the cube-corner type retroreflective elements, which renders the strength of the walls very unsatisfactory.

As above-stated, in order to obtain the connecting walls having excellent strength property, flowability of the molten part of the support film as exhibited in the occasion of constructing the connecting walls by partially thermofusing and thermoforming the support film is very important.

Heretofore various attempts have been made to improve strength of the connecting walls. For example, JP-B-13561/1986 [=U.S. Pat. No. 4,025,159; DE-A-2,706,589] proposes to bring about the strength improvement, by forming the connecting walls (network of intersecting bonds) through thermoforming the support film and thereafter applying radioactive rays to the connecting walls.

In this Japanese Patent Publication No. 13561/1986, the capsule type retroreflective sheeting is manufactured as follows, as exemplified in its Example 1.

First, glass beads are partially embedded in a layer of polyethylene (hereafter may be abbreviated as PE), which is a thermoplastic polymer, of a provisional support (composed of the PE layer and paper). Onto the provisional support with its upper surface vapor-coated of a metal such as aluminum, a radiation-curable resin composition is coated and dried to form a support film. Said support film may be prepared in advance by coating a similar radiation-curable resin composition over a film, e.g., polyethylene terephthalate (hereafter occasionally abbreviated as PET) film, and drying the same, which can be superposed on the glass beads exposed on the provisional support and then integrated with the support by exerting pressure.

Then a PET film having a pressure-sensitive adhesive layer is laminated on the back of the support film and adhered. The provisional support is stripped away to provide a base sheet composed of the support film and a layer of glass beads with their approximately hemispheres, which are covered with the vapor-coated metal membrane, embedded in, and supported by, the support film. On the glass beads-embedded side of this base sheet a polymethyl methacrylate film which serves as a light-transmitting protective film (cover film) is laminated, and the laminate is inserted between a pair of steel platens, one being smooth-surfaced and the other having convex projections, and heated. Whereby the base sheet is partially thermoformed to laminate and bind the protective film and the base sheet by a network of connecting walls (bonds). Then the resultant laminated sheet is irradiated with radioactive rays. Thus the bonds are cured to provide an encapsulated lens-type retroreflective sheeting.

The above Patent Publication proposes to improve the intimacy of the adhesion between the connecting walls and the protective film by irradiation of radioactive rays after the connecting walls have been formed. According to our investigations, however, use of the acrylic polymer having no functional group and a bifunctional monomer only, as disclosed in working Examples of said Publication, cannot improve strength of the connecting walls per se to the level exhibiting sufficient weatherability. On the other hand, attempts to further increase strength of the connecting walls result in insufficient flowability of the molten part of the support film during its thermoforming. This leads to formation of many connecting walls having non-uniform structures or shapes, and it is difficult to obtain retroreflective sheetings having sufficient weatherability.

Attempts to use thermoplastic film as the support film have also been made. JP-A-121043/1987 [=U.S. Pat. No. 4,897,136; U.S. Pat. No. 5,064,272; EP-A-225,103] proposes a production process of encapsulated lens-type retroreflective sheetings in which high molecular weight thermoplastic film is used for the support film. However, because of the use of such a thermoplastic film as the support film, there is a limit to the strength obtainable for the connecting walls formed by thermoforming the support film according to this proposal, and the walls having sufficient strength cannot be obtained.

JP-A-194405/1985 [=U.S. Pat. No. 4,653,854; DE-A-3,508,701; GB-A-2,156,274] proposes a process for using a double-layer structured support film in which the upper layer side has a greater adhesive strength to the protective film than that of the lower layer side, while the lower layer has a greater cohesive force than that of the upper layer. The Official Gazette of said laid-open application teaches that a support film which becomes flowable under heating so that it can form the connecting walls but is curable by crosslinkage at normal temperature after forming the walls is desirable.

However, said JP-A-194405/1985 contains no concrete teaching about the favorable flow characteristics of the support film in the occasion of thermofusing and thermoforming the connecting walls. As a matter of fact, according to our investigations the combinations of resins for making the support film and crosslinking agents as indicated in its working Examples are found to fail to give suitable flowability, and consequently the formed connecting walls tend to have insufficient strength.

We have made extensive studies on capsule type retroreflective sheetings, to discover that an excellent capsule type retroreflective sheeting free from all the defects inherent in the conventional art as above-described can be obtained by forming the connecting walls of uniform structure and uniform shape free from internal faultily filled portions by using a support film which exhibits favorable flow characteristics at the time of thermofusing and thermoforming the connecting walls and which contains a specific crosslinking agent; and thereafter crosslinking the connecting walls to markedly increase their strength.

SUMMARY OF THE INVENTION

Thus, according to the present invention there is provided a capsule type retroreflective sheeting which is composed of a light-transmitting protective film, a support film, and the connecting walls for partially connecting the two films while retaining the spaces between the two films, said protective film and/or the support film having retroreflective elements disposed therein, said connecting walls having been formed by partially thermofusing and thermoforming the support film, said sheeting being characterized in that said support film is composed of a resin composition which contains a thermofusible resin and a crosslinking agent, said thermofusible resin having functional groups reactable with the crosslinking agent and having a shearing stress at 180° C. within a range of $9\times10^3$–$1\times10^5$ dyne/cm$^2$, and which is capable of forming after the crosslinking reaction a nonfusible, crosslinked resin having a shearing stress at 180° C. of at least $1\times10^6$ dyne/cm$^2$.

Hereinafter the capsule type retroreflective sheeting of the present invention is explained in further details.

DESCRIPTION OF THE PREFERRED EMBODIMENTS

The prominent, characteristic feature of the capsule type retroreflective sheeting of the present invention resides in the use, as the support film, of a resin composition containing a thermofusible resin and crosslinking agent, said thermofusible resin exhibiting very low shearing stress before a crosslinking reaction compared with that of conventional resins, for the purpose of forming the connecting walls of uniform structure and uniform shape. Said support film forms a non-fusible, crosslinked resin layer having a strength comparable to, or exceeding, that of conventional support films, when its crosslinking reaction is advanced after having been partially thermofused to form the connecting walls for partially connecting the light-transmitting protective film and the support film while retaining the spaces between said two films.

The thermofusible resin to be used to make the support film has a shearing stress at 180° C. within a range of $9 \times 10^3 - 1 \times 10^5$ dyne/cm$^2$, preferably $9.5 \times 10^3 - 9.5 \times 10^4$ dyne/cm$^2$, inter alia $1.4 \times 10^4 - 9 \times 10^4$ dyne/cm$^2$; and forms a non-fusible, crosslinked resin after the crosslinking reaction, said resin having a shearing stress at 180° C. of at least $1 \times 10^6$ dyne/cm$^2$, preferably at least $2 \times 10^6$ dyne/cm$^2$, inter alia, $3 \times 10^6 - 3 \times 10^7$ dyne/cm$^2$.

Thermofusible resins having shearing stress before the crosslinking reaction exceeding the above upper limit do not exhibit favorable flow characteristics at the time of thermofusing and thermoforming of the connecting walls, rendering it difficult to form the connecting walls that have uniform structure and shape. Whereas, such thermofusible resins which have only small shearing stress less than the above lower limit are objectionable, because the connecting walls formed therefrom display only insufficient shape retention. Furthermore, when the shearing stress of the crosslinked resin after the crosslinking reaction is less than $1 \times 10^6$ dyne/cm$^2$, strength of the connecting walls cannot be improved, and the resulting capsule type retroreflective sheeting shows insufficient durability.

The support film after the crosslinking reaction desirably has the tensile properties such that the tensile strength at 70° C. is at least 10 kg/cm$^2$, preferably at least 20 kg/cm$^2$ inter alia between 30–150 kg/cm$^2$; and the elongation-at-break at 0° C. is at least 5%, preferably at least 10%, inter alia, between 20–50%.

Here the shearing stress of thermofusible resins and that of the support film after a crosslinking reaction, and the tensile properties of the support film after crosslinking reaction are determined by the following methods.

Shearing stress of thermofusible resins and crosslinked reins

Shearing stress of thermofusible resins, and that of the crosslinked resins formed upon crosslinking reaction of the resin compositions of thermofusible resins, as blended with crosslinking agents and other additives as later specified (cellulose derivatives, titanium dioxide and the like) are determined by the flow property test method as specified by JIS-K-7199 using "Capirograph" manufactured by Toyoseiki Seisakusho, Ltd., at the measuring temperature of 180° C. and the extrusion rate of 5 mm/min.

Tensile properties of crosslinked resins

As the test specimens, those crosslinked resins obtained upon subjecting the resin compositions to the crosslinking reaction under the prescribed conditions are cut to each 10 mm-wide, 46 mm-long pieces. Each test specimen is subjected to a tensile test using "TENSILON" of ORIEnTEC Co., with a grip interval of 10 mm and a pull rate of 100 mm/min., at 70° C. and 0° C. The maximum stress at 70° C. is recorded as the tensile strength, and the elongation-at-break at 0° C. is recorded as the elongation-at-break.

In the capsule type retroreflective sheeting of the present invention, the support film is not necessarily of a single layer. If desired, a support film having a structure composed of two or more layers of different kinds and/or different degrees of crosslinkage may be used. Furthermore, for example, one or more reinforcing layers may be provided on the back of the support film, if necessary, for the purpose of improving strength of the sheeting.

The support film of the present invention which satisfies the above requirement is composed of above-specified resin composition containing a thermofusible resin and a crosslinking agent, said thermofusible resin having functional groups which are reactable with the crosslinking agent, said composition being capable of forming a non-fusible, crosslinked resin after the crosslinking reaction.

Examples of useful thermofusible resins include acrylic resins, polyurethane resins, silicone resins, polyester resins, fluorine-containing resins, vinyl acetate resins, vinyl chloride resins, polyolefin resins and polyamide resins, etc. These resins can be used either singly or in the form of a copolymer or blend of more than one resin components. Of those, acrylic resins which excel in weatherability and are easy of controlling their thermofusible property are preferred. In particular, acrylic resins obtained by copolymerizing at least two acrylic monomers are most conveniently used.

As the functional groups reactable with crosslinking agents, which are contained in such thermofusible resins useful for the present invention, for example, active hydrogen-containing functional groups such as hydroxyl, methylol, amino, epoxy, carboxyl and mercapto groups, etc. may be named. Of those, hydroxyl group is the preferred. Those functional groups can be introduced by such means as copolymerizing monomers having these functional groups at the time of preparing those resins, or reacting those already formed resins with the compounds having these functional groups.

The content of these functional groups in the thermofusible resins is not critical, but is variable depending on the kind of functional groups or the resins. Whereas, normally preferred content is within the range of 0.1–5 equivalents, in particular, 0.2–3 equivalents, inter alia, 0.3–2 equivalents, per 1 kg of the thermofusible resin. Whereby the strength of the connecting walls themselves after the crosslinking reaction can be remarkably enhanced, while retaining an adequate pliability of the support film after said reaction.

Such acrylic resins which can be particularly advantageously used in the present invention can be prepared, for example, by using as the main component one or more of acrylic monomers which do not have in their side chains functional groups that are reactable with the later-described crosslinking agent (such monomers may be hereafter referred to as "non-functional monomers") and copolymerizing such main component with one or more of monomers containing in their side chains active hydrogen-containing functional groups such as hydroxyl, methylol, amino, epoxy, carboxyl or mercapto groups, etc. ("functional monomers") by such means as solution polymerization, suspension polymerization, emulsion polymerization, bulk polymerization, or the like.

Examples of above non-functional monomers include (cyclo)alkyl (meth)acrylates such as methyl acrylate, ethyl acrylate, n-propyl acrylate, n-butyl acrylate, i-butyl acrylate, t-butyl acrylate, n-hexyl acrylate, n-octyl acrylate, i-octyl acrylate, 2-ethylhexyl acrylate, i-nonyl acrylate, cyclohexyl acrylate, methyl methacrylate, ethyl methacrylate, n-butyl methacrylate, i-butyl methacrylate, t-butyl methacrylate, n-hexyl methacrylate, n-octyl methacrylate, i-octyl methacrylate, 2-ethyl hexyl methacrylate, i-nonyl methacrylate, n-dodecyl methacrylate, i-dodecyl methacrylate and cyclohexyl methacrylate.

Examples of functional monomers include hydroxyalkyl (meth)acrylates such as 2-hydroxyethyl acrylate, 2-hydroxypropyl acrylate, 2-hydroxyethyl methacrylate, 2-hydroxypropyl methacrylate, and the like; (dialkyl)aminoalkyl (meth)acrylates such as dimethylaminoethyl acrylate, dimethylaminoethyl methacrylate, diethylaminoethyl acrylate, diethylaminoethyl methacrylate, and the like; epoxy group-containing ethylenically unsaturated monomers such as glycidyl acrylate, glycidyl methacrylate, allylglycidylether and the like; and carboxyl group-containing ethylenically unsaturated monomers such as acrylic acid, methacrylic acid, fumaric acid, maleic acid, itaconic acid, cinnamic acid, and the like.

Of the acrylic resins, those particularly preferred are obtained by copolymerizing: 20–95% by weight of non-functional monomers such as methyl acrylate, ethyl acrylate, n-butyl acrylate, 2-ethylhexyl methacrylate, etc. which give homopolymers having a relatively low glass-transition temperature (hereafter may be abbreviated as "Tg"), preferably a Tg not higher than 10° C.; 95–20% by weight of non-functional monomers such as methyl methacrylate, i-butyl methacrylate, cyclohexyl methacrylate, etc. which give homopolymers having relatively high Tg, preferably a Tg not lower than 40° C.; and 5–15% by weight of functional monomers such as 2-hydroxyethyl acrylate, 2-hydroxyethyl methacrylate, 2-hydroxypropyl methacrylate, acrylic acid, methacrylic acid, etc.

Such acrylic resins generally have Tg values within a range of −30° to 50° C., preferably −10° to 30° C., inter alia, −5° to 20° C. Use of such resins allow formation of support film which have adequate pliability and sufficient heat resistance. "Tg" said in this specification is the value measured by the below-described differential scanning calorimetry (DSC method).

Measurement of glass transition temperature (Tg)

Into a cylindrical cell of about 5 mm in inner diameter and about 2.5 mm in depth, made of about 0.1 mm-thick aluminum foil, about 10 mg of a sample resin which has been dried at 100° C. for 2 hours is fed after weighing. Using this as the test specimen, differences in specific heat capacity in the vicinity of glass transition temperature of the sample, starting from −150° C. and at a temperature rise rate of 5° C./min., are measured with Differential Scanning Calorimeter: "SSC-5000" Model, Seiko Electronic Industries, Co. Tg of the test specimen is determined from the measured results.

Said acrylic resins, furthermore, may have a weight-average molecular weight (hereafter may be abbreviated as "Mw") within a range of 10,000–200,000, preferably 20,000–100,000, inter alia, 30,000–80,000. Resins having a Mw not higher than the above upper limit are preferred because they do not cause such a drawback that connecting walls of non-uniform structure and shape are formed to markedly reduce strength of the walls or adhesive strength between the protective film and the connecting walls, in the occasion of constructing the connecting walls by thermofusing and thermoforming of the support film. Also the resins having a Mw not lower than the above lower limit are preferred because they are free from such a drawback that the embedding depth of the glass beads is changed according to only fine variations in the processing conditions such as the nip pressure and nip temperature, in the occasion of pushing the glass beads into the support film to effect their embedment. In this specification, Mw is the value determined by gel permeation chromatographic method (GPC method).

As the crosslinking agents which can be concurrently used with above-described resins, for example, polyisocyanate compounds, polyaziridine compounds, polyepoxy compounds and amino resins may be named. Of those, polyisocyanate compounds are used most conveniently. The amount of use of the crosslinking agent is not strictly limited, but is variable over a wide range depending on the kind of individual crosslinking agent or resin used. Generally, however, it can be within a range of 0.25–1.5 equivalents, preferably 0.5–1.2 equivalents, inter alia, 0.6–1.1 equivalents, per equivalent of the functional group in the thermofusible resin.

Of the combinations of functional groups in thermofusible resins and crosslinking agents, which are particularly advantageous for the present invention, it is most convenient to use hydroxyl group as the functional group and a polyisocyanate compound as the crosslinking agent, for the following reasons: the crosslinking reaction is relatively slow in progress and does not impair flowability of the thermofusible resin at the time of forming the connecting walls by thermofusing of said resin; the subsequent crosslinking reaction progresses at normal temperature and is free from undesirable side-reactions; the reaction can produce high crosslinking density to improve the strength of the connecting walls per se.

Specific examples of polyisocyanate compounds which are the crosslinking agents used with particular advantages include; aromatic polyisocyanates such as 1,3- or 1,4-phenylene diisocyanate, 2,4- or 2,6-tolylene diisocyanate, 1,5-naphthylene diisocyanate, 4,4'-diphenylmethane diisocyanate, 3,3'-dimethyl diphenylmethane-4,4'-diisocyanate, 1,3-xylylene diisocyanate, and the like; aliphatic polyisocyanates such as 1,4-tetramethylene diisocyanate, 1,6-hexamethylene diisocyanate, 2,2,4-trimethyl-1,6-hexamethylene diisocyanate, 1,8-coramethylene diisocyanate, 1,10-decamethylene diisocyanate and the like; alicyclic polyisocyanates such as 1,3- or 1,4-cyclohexylene diisocyanate, 1-methyloyclohexane-2,4- or 2,6-diisocyanate, 4,4'-dicyclohexylmethane diisocyanate, isophorone diisocyanate, 1,3-isocyanatomethylcyclohexane and the like; dimers or trimers of these isocyanates; and adducts of these isocyanates with, for example, divalent or trivalent polyols such as ethylene glycol, trimethylolpropane, or the like.

Of those polyisocyanate compounds, aliphatic polyisocyanate compounds, alicyclic polyisocyanate compounds, dimers or trimers of these isocyanates and adducts of these isocyanates with divalent or trivalent polyols are preferred because their use leads to good weatherability and excellent resistance to yellowing of the resulting retroreflective sheeting.

The resin compositions to constitute the support film according to the invention may contain, besides the thermofusible resin containing functional groups reactable with the crosslinking agent and the crosslinking agent, cellulose derivatives, if necessary. Cellulose derivatives function as a modifier of the support film and can impart to the support film such functions as excellent resistance to repetitive extension and constriction, heat resistance, etc. In consequence, the capsule type retroreflective sheeting of the present invention can be imparted with unique properties such as excel lent weatherability.

As the cellulose derivatives, those whose Tg is no lower than 90° C., preferably within a range of 100°–190° C., inter alia, 100°–170° C., are advantageously used. The cellulose derivatives, furthermore, having a number average molecular weight (Mn) not lower than 15,000, in particular, within a range of 20,000–80,000 are generally preferred.

Kind of the cellulose derivatives is subject to no specific limitation, and various commercial cellulose derivatives can be used. Whereas, it is normally preferred to use cellulose esters excelling in waterproofness and having high modification effect. In particular, acyl esters of cellulose having an acylation ratio of 10–90%, preferably 30–70%, inter alia, 40–60%, are favorably used. Examples of such especially preferred cellulose acyl esters include: cellulose acetate, cellulose acetate butyrate and cellulose acetate propionate.

Such cellulose derivatives can be used at such ratios as normally 0–50 parts, preferably 1–40 parts, inter alia, 3–30 parts, per 100 parts of above-described thermofusible resin, the parts being by weight.

The resin compositions useful for the present invention, if necessary, may take a form of an organic solvent-insoluble or difficultly soluble and/or thermally non-fusible or difficultly fusible, fine granular resin as added to, and dispersed in, a thermofusible resin matrix phase. Said fine granular resin normally takes grain forms of mono-layered single spheres or multi-layered single spheres having an average particle size of about 0.01–4.0 pro, or of compounded spheres formed by aggregation of a plurality of such single spheres. The resin component which constitutes such fine granular resin has a very high molecular weight as the result of a crosslinking reaction, for example. More specifically, those fine granular polymers listed in the commercial name and maker table of fine granular polymers on page 100 of *Industrial Materials,* (pub. by Daily Industrial Newspaper Co.), vol. 38, No. 9 (1990), and multilayer-structured polymer compositions as described in JP-B-36645/1984 (=U.S. Pat. No 4,025,525) may be used. Such fine granular resins are usable generally at a ratio not more than 50 parts, e.g., within a range of 3–30 parts, in particular, 5–20 parts, per 100 parts of said thermofusible resins, the parts being by weight.

The resin compositions constituting the support film according to the invention may be further blended with conventionally used amounts of other additives as individual occasions demand, examples of the additives including extenders or coloring pigments such as titanium dioxide, magnesium oxide, calcium carbonate, barium sulfate, chrome yellow, Cyanine Blue, Cyanine Green, etc.; ultraviolet absorbing agents such as benzotriazole-type ultraviolet absorbers, benzophenone-type ultraviolet absorbers, cyanoacrylate-type ultraviolet absorbers, etc.; photostabilizers such as hindered amine-type photostabilizers, hindered phenolic photostabilizers, etc.; antioxidants such as phenolic antioxidants, phosphite type antioxidants, thioether-type antioxidants, etc.; and fluorescent brightening agents such as imidazole derivatives, diaminostilbenedisulfonic acid derivatives, coumarin derivatives, imidazolone derivatives, etc.

The resin compositions used in the present invention preferably have a melt index (hereafter occasionally abbreviated as "MI value") within a range of 800–4,000 g/10 min., in particular, 900–3,000 g/10 min. , inter alia, 1,000–2, 000 g/10 min. MI values of the resin composition not higher than the above upper limit are preferred because whereby such inconveniences can be avoided that the embedding depth of the glass beads is changed according to only fine variations in the processing conditions, e.g., nip pressure and nip temperature, or the like, in the occasion of pushing the glass beads into the support film to effect their embedment. Furthermore, MI values not lower than the lower limit are preferred because the resin composition having such MI values do not cause such a drawback that connecting walls of non-uniform structure and shape are formed to markedly reduce strength of the walls or adhesive strength between the protective film and the connecting walls, in the occasion of constructing the connecting walls by thermal fusing and forming of the support film. In this specification, the MI values are measured in accordance with ASTM D 1238, in the manner as below-described.

Measurement of melt indices (MI values)

Using K. K. TECHNICAL SEVEN "Meltindexer", melt index values are decided by the flow property test method as described in ASTM D 1238. The measuring temperature is 230° C., and the load is 1.2 kg. As the test specimens, those prepared from solutions of the support film-forming resin compositions composed of those thermofusible resins blended with the prescribed amounts of the various additives as described above, excepting the crosslinking agents, are used.

The capsule type retroreflective sheeting of the present invention can be prepared by heretofore known methods using known materials, e.g., those described in JP-A-194405/1985 (=U.S. Pat. No. 4,653,854) or JP-A-196653/1990, excepting the point of using an above-described resin composition as the constituent material of the support film, said composition comprising a thermofusible resin having a shearing stress at 180° C. within a range of $9 \times 10^3 – 1 \times 10^5$ dyne/cm$^2$ and a crosslinking agent, and providing after the crosslinking reaction a non-fusible resin having a shearing stress at 180° C. of at least $1 \times 10^6$ dyne/cm$^2$.

By way of an example, one production embodiment of the capsule type retroreflective sheeting is described hereinbelow.

First, for example, a process paper laminated with a surface layer of a thermoplastic polymer such as polyethylene, which is used as a provisional support, is heated so as to soften said thermoplastic polymer layer, and onto which glass beads having a refractive index of about 1.7–2.0 and an average particle size of about 20–150 μm are densely dispersed as substantially a monolayer. The glass beads are pressed with, e.g., nip rolls, to be embedded in the thermoplastic polymer layer to about ⅓–½ of their diameters. On the exposed glass bead surfaces then a metal such as aluminum as a light-reflective element is vacuum-deposited to cover approximately hemispheres of the glass beads with the vapor-coated metallic membrane.

Then a support film which has been formed in advance by, e.g., a solution-coating method, on a process sheet such as a polyethylene terephthalate film which has been surface treated with, e.g., a silicone-type release treating agent is superposed on the provisional support in such a manner that the support film faces with the metal vapor-coat ed glass beads-bearing side of the provisional support While applying heat, if necessary, to soften the sup port film, the glass beads are pushed into the support film with, e.g., nip rolls so that they are embedded in said film to about ⅓–½ of their diameters. In that occasion, it is preferred to push the beads into the support film retaining a narrow space between the vapor-coated metallic membrane and the support film surface, in order to avoid transferring of said membrane on the thermoplastic polymer layer on the provisional support to the support film. It is also possible to prevent direct contact of the vapor-coated metallic membrane with the support film in that occasion, by providing a suitable thin film, e.g., one containing a coupling agent, on the vapor-coated metallic membrane, i.e., on the glass beads-bearing, vacuum deposited metallic membrane-coated surface of the provisional support.

Examples of useful coupling agent include: silane type coupling agents such as methyl methoxysilane, γ-glycidoxypropyl-methylmethoxysilane, γ-methacryloxy-propyl-methylmethoxysilane, etc.; titanate type coupling agents such as isopropyl triisostearoyl titanate, tetraoctyl bis(ditridecylphosphite) titanate, tetra(2,2-diallyloxymethyl-butyl) bis-(ditridecylphosphite) titanate, etc., aluminum type coupling agents such as diisopropylate aluminum oleylacetoacetate, isopropylate(acrylate) aluminum oleylacetoacetate, isopropylate(acetoacetate)aluminum oleylacetoacetate, etc.; and zircoaluminate type coupling agents such as 2-aminopropionylzircoaluminate, 2-carboxypropionylzircolaluminate, myristoylzircoaluminate, etc.

Thickness of the support film is not critical, but may be varied over a wide range according to the kind of resin used, glass bead size, etc. In general terms, however, it is conveniently designed to be 20–200 μm, preferably 30–150 μm, inter alia, 50–120 μm.

Said support film is not necessarily formed of a single layer as above-described, but may have a two or more layered structure, said layers differing in kind and/or degree of crosslinkage. Such plural layers composing the support film can be prepared from the resin compositions as above-described, each containing a thermofusible resin having functional groups reactable with a crosslinking agent and the crosslinking agent, and being capable of forming after the crosslinking reaction a non-fusible, crosslinked resin.

For forming such a plural layered support film, those thermofusible resins previously named, such as acrylic resins, polyurethane resins, silicone resins, polyester resins, fluorine-containing resins, vinyl acetate resins, vinyl chloride resins, polyolefin resins, polyamide resins, etc. can be used. These can be used either singly or in the form of copolymers or blends of more than one of such resin components. To Tg, Mw, kind and content of functional groups, favorable combinations with crosslinking agents, quantitative ratio of the crosslinking agent and other usable additives (cellulose derivatives, extender or coloring pigment, ultraviolet absorber, photostabilizer, antioxidant, fluorescent brightening agent, etc.) of these thermofusible resins, the foregoing descriptions in respect of the support film are applicable as they are. Any two adjacent layers among the plural layers may be having different kinds of thermofusible resins, different kinds of crosslinking agents, different compositions and/or different degrees of cross-linkage. Thickness of individual layers is variable over a wide range depending on the number of layers present. It is normally convenient, however, to so design them that the thickness of the support film as a whole falls within the aforesaid range of 20–200 μm.

Furthermore, for the purpose of increasing strength of the capsule type retroreflective sheeting of the present invention, one or more of reinforcing layers may be provided on the back of the support film, if necessary. Such reinforcing layer or layers again can be composed of the resin composition or compositions each comprising a thermofusible resin having functional groups which are reactable with a crosslinking agent, and being capable of forming after the crosslinking reaction a non-fusible, crosslinked resin. Whereas, it is normally preferred to make the reinforcing layer relatively tough, by causing it to have a higher degree of crosslinkage than that of the support film. Thickness of the reinforcing layer is conveniently designed to be within a range of 10–100 μm in general, particularly 30–80 μm.

For the purpose of improving intimacy of the adhesion between the connecting walls and the light-transmitting protective film and improving strength of the connecting walls themselves, furthermore, a laminate of support film and support film-reinforcing layer may be formed as individual occasions demand, by setting the degree of crosslinkage of the surface layer, which is embedding and holding the glass beads, of the support film at a low level, and sequentially laminating the layers whose degree of crosslinkage is sequentially raised as their locations approach to the reinforcing layer, by increasing the functional group content of the thermofusible resin component and/or the amount of crosslinking agent added.

Then the provisional support is stripped away from the laminate of the support film on the process sheet and the provisional support with its vapor-coated metal membrane-covered glass beads-bearing surface facing the support film, and on the exposed glass bead surfaces a light-transmitting protective film is superposed.

The light-transmitting protective film useful for the capsule type retroreflective sheeting of the present invention is subject to no special limitation as to its construction material, so long as it has a total light transmittance of at least 20%, preferably at least 40%, and a reasonable level of pliability. For example, any of acrylic resin film, fluorine-containing resin film, polyurethane resin film, vinyl chloride resin film, polycarbonate resin film, polyester resin film, polyolefin resin film, etc. may be used. Among those light-transmitting protective films, the ones excelling in weatherability are preferred. In particular, acrylic resin film and fluorine-containing resin film exhibit excellent weatherability and are particularly preferred as the protective film for the reflective sheeting which is used in outdoors for a prolonged period.

It is generally preferred that such protective film be unstretched. Because, while a mono axially or multiaxially stretched film exhibits higher mechanical strength, the stretching is apt to leave strain in the film, which impairs durability of the resultant retroreflective sheeting.

When the protective film has insufficient adhesive ability to the above-described support film, it is desirable to treat its surface facing the support film in advance to improve its adhesive property. As such adhesive property-improving treatment, any means known per se may be employed, e.g., corona discharge, plasma discharge, plasma-coating treatment, etc. Of those, corona discharge is preferred, as it is relatively easy of operation and can achieve excellent effect.

Thickness of the protective film is variable over a wide range depending on the intended use of the retroreflective sheeting, while normally it ranges 20–200 μ, preferably 40–150 μ, inter alia, 50–100 μ.

Then, while maintaining the state of the protective film as laid over the glass beads-bearing side of the support film, the support film is heated with, for example, an emboss roll having continuous, linear projections. Whereby the support film is partially thermofused and formed to bind the protective film and the support film with continuous linear connecting walls. Subsequently applying an elevated temperature, e.g., of about 30°–about 40° C., to the product or allowing it to stand at room temperature for a prescribed period, the resin composition or compositions constituting the support film and connecting walls are crosslinked to form non-fusible, crosslinked resin layers.

Hereinafter the present invention is more specifically explained, referring to working Examples and Comparative Examples, in which parts and percentages are by weight unless otherwise specified.

Example 1

A provisional support formed of a polyethylene (PE) having a softening temperature of about 105° C. as laminated on paper was heated to about 105° C., onto which glass beads having an average particle size of about 65 μm and a refractive index of about 1.91 were uniformly and densely dispersed as substantially a monolayer, and pressed into the PE with nip rolls to about ⅓ of their diameter.

Onto the surface of the provisional support on which the glass beads were exposed, aluminum was vacuum-deposited to form a vapor-coated metallic membrane of about 1 μm in thickness on approximately the hemispheres of the glass beads.

Then on a release-treated, 20 μm-thick polyethylene terephthalate (PET) film, a support film-forming solution of a resin composition was applied and dried to provide an about 110 μm-thick support film. Said solution of the resin composition was the one formed by first preparing an acrylic resin solution by mixing 100 parts of a 50% solid acrylic resin solution [an ethyl acetate/toluene solution of an acrylic resin (Tg: about 10° C., Mw: about 40,000, OH group content: about 0.38 equivalent/kg, shearing stress: $6.5 \times 10^4$ dyne/cm$^2$) obtained by copolymerizing 34% of methyl methacrylate (MMA), 61% of ethyl acrylate (EA) and 5% of 2-hydroxyethyl methacrylate (HEMA)] with 15 parts of titanium dioxide; and further mixing the resulting acrylic resin solution with 33 parts of a 15% solid methyl isobutyl ketone (MIBK) solution of cellulose acetate butyrate (CAB) (Tg: about 130° C., Mn: about 30,000, acylation ratio: about 52%) and 5 parts of a 75% sol id hexamethylene diisocyanate (HMDT) type crosslinking agent, "SUMIDUR N" [biuret type, Sumitomo Bayer Urethane Co., Ltd.: NCO group/OH group≈1.0 (equivalent ratio)]. When measured, this support film had an MI value of 1300 g/10 min.

This support film was laid over the vacuum-deposited metal membrane-coated glass beads on the first formed provisional support, and pressed at a linear pressure of 900 kg/m, under heating at 70° C., to embed the glass beads into the support film to about ⅓ of their diameter. Then the PE laminated paper serving as the provisional support was stripped away to transfer the glass beads to the support film.

Then an about 75 μm-thick, unstretched acrylic film having a total light transmittance of about 93% was laid over the glass beads-bearing surface of the support film, which were caused to together pass through a clearance between a metal roll having reticulated ridge portions of a line width about 0.3 mm and a surface temperature of about 170° C., and a rubber roll having a surface temperature of about 60° C., the acrylic film side coming into contact with the rubber roll, while pressing said metal roll against the release-treated PET film side of the support film, to effect partial thermofusing and thermoforming. Then the product was aged for 20 days at room temperature to substantially complete crosslinkage of the support film. The shearing stress of the support film after the crosslinking reaction was $1.2 \times 10^7$ dyne/cm$^2$; the tensile strength at 70° C. was 38 kg/cm$^2$; and the elongation at 0° C. was 36%.

The release-treated PET film was removed from the resulting thermoformed product which was subsequently laminated with an about 40 pro-thick layer of an acrylic, pressure-sensitive adhesive (NIPPON CARBIDE IND. Co., Inc., "NISSETSU KP-997") formed separately on an about 75 μm-thick, silicone-treated PET release film, said pressure-sensitive adhesive coming into contact with the support film, to provide a retroreflective sheeting.

The composition and various property values of the resin composition constituting the support film, and the property values of the crosslinked resin are shown in Table 1, and performance of the resulting encapsulated lens-type retroreflective sheeting, in Table 2. The encapsulated lens-type retroreflective sheeting thus obtained exhibited excellent characteristics of little reduction ratio in retroreflective performance and almost no peeling of the light-transmitting protective film after severe weatherability tests.

Example 2

A retroreflective sheeting was prepared in the identical manner with Example 1, except that the support film was made from a solution of a resin composition which was prepared as follows: 100 parts of a 50% solid acrylic resin solution [an ethyl acetate/toluene solution of an acrylic resin obtained by copolymerizing MMA 22%, EA 63% and HEMA 15% (Tg: about 5° C., Mw: about 70,000, OH group content: about 1.15 equivalents/kg, shearing stress: $7.7 \times 10^4$ dyne/cm2)] was mixed with 15 parts of titanium dioxide, and the resulting solution was further mixed with 33 parts of a 15% solid MIBK solution of CAB (same as the one used in Example 1) and 14 parts of a 75% solid HMDI-type crosslinking agent (same as the one used in Example 1) [NCO group/OH group≈0.9 (equivalent ratio)].

The composition and various property values of the resin composition constituting the support film, and the property values of the crosslinked resin are shown in Table 1, and performance of the resulting encapsulated lens-type retroreflective sheeting, in Table 2. The encapsulated lens-type retroreflective sheeting thus obtained exhibited excellent characteristics of little reduction ratio in retroreflective performance and almost no peeling of the light-transmitting protective film after severe weatherability tests.

Example 3

On the same kind of the PET film as used in Example 1, a reinforcing layer-forming resin solution was applied and dried to form an about 30 μm-thick reinforcing layer. Said resin solution was prepared by mixing 100 parts of a 50% solid acrylic resin solution [an ethyl acetate/toluene solution of an acrylic resin obtained by copolymerizing MMA 20%, EA 65% and HEMA 15% (Tg: about 2° C., Mw: about 120,000, OH group content: about 1.15 equivalents/kg)] with 14 parts of a 75% solid HMDI-type crosslinking agent (same as the used in Example 1) [NCO group/OH group≈0.9 (equivalent ratio)]. Then the same support film-forming solution of the resin composition as the one used in Example 1 was applied onto this reinforcing layer and dried to form an about 75 μm-thick support film, whereby providing a reinforcing layer-support film laminate. Then a retroreflective sheeting was prepared in the manner as described in Example 1, except that this laminate was used in place of the support film used in Example 1.

The composition and various property values of the resin composition constituting the support film, and the property values of the crosslinked resin are shown in Table 1, and performance of the resulting encapsulated lens-type retroreflective sheeting, in Table 2. The encapsulated lens-type retroreflective sheeting thus obtained exhibited excellent characteristics of little reduction ratio in retroreflective performance and almost no peeling of the light-transmitting protective film after severe weatherability tests.

Example 4

A reinforcing layer-support film laminate was formed in the identical manner as described in Example 3. A retroreflective sheeting was prepared using this laminate, in the manner otherwise identical with Example 1, except that the unstretched acrylic film used in Example 1 was replaced by an about 50 μm-thick polyvinylidene fluoride resin film (DENKI KAGAKU KOGYO K. K., "DX Film") which had been extrusion-molded on a 50 μm-thick PET film, and that the partial thermofusing and forming was conducted in such a manner that the light-transmitting film was overlaid on the support laminate with its polyvinylidene fluoride resin film side facing the glass beads, and together passed through the clearance, the PET film side of the polyvinylidene fluoride resin film coming into contact with the rubber roll.

The composition and various property values of the resin composition constituting the support film, and the property values of the crosslinked resin are shown in Table 1, and performance of the resulting encapsulated lens-type retroreflective sheeting, in Table 2. The encapsulated lens-type retroreflective sheeting thus obtained exhibited excellent characteristics of little reduction ratio in retroreflective performance and almost no peeling of the light-transmitting protective film after severe weatherability tests, Comparative Example 1

A retroreflective sheeting was prepared in the identical manner with Example 1, except that the support film was made from a solution of a resin composition which was prepared as follows: 100 parts of a 50% solid acrylic resin solution [an ethyl acetate/toluene solution of an acrylic resin obtained by copolymerizing MMA 25%, EA 70% and HEMA 5% (Tg: about 0° C., Mw: about 20,000, OH group content: about 0.38 equivalent/kg, shearing stress: $8.5 \times 10^3$ dyne/cm2)] was mixed with 15 parts of titanium dioxide. Thus obtained acrylic resin solution was further mixed with 33 parts of a 15% solid MIBK solution of CAB (same as the one used in Example 1) and 5 parts of a 75% solid HMDI-type crosslinking agent (same as the one used in Example 1) [NCO group/OH group≈1.0 (equivalent ratio)].

The composition and various property values of the resin composition constituting the support film, and the property values of the crosslinked resin are shown in Table 1, and performance of the resulting encapsulated lens-type retroreflective sheeting, in Table 2. Said encapsulated lens-type retroreflective sheeting showed a substantial reduction ratio in retroreflective performance and not able peeling of the light-transmitting protective film in severe weatherability tests. Thus product exhibiting sufficient weatherability could not be obtained.

Comparative Example 2

A retroreflective sheeting was prepared in the identical manner with Example 1, except that the support film was made from a solution of a resin composition which was prepared as follows: 100 parts of a 40% solid acrylic resin solution [an ethyl acetate/MIBK solution of an acrylic resin obtained by copolymerizing MMA 40%, EA 55% and HEMA 5% (Tg: about 16° C., Mw: about 40,000, OH group content: about 0.38 equivalent/kg, shearing stress: $8.4 \times 10^4$ dyne/cm2)] was mixed with 40 parts of titanium dioxide. The resulting acrylic resin solution was further mixed with 1.4 parts of a 75% solid HMDI-type crosslinking agent (same as the one used in Example 1) [NCO group/OH group≈0.35 (equivalent ratio)].

The composition and various property values of the resin composition constituting the support film, and the property values of the crosslinked resin are shown in Table 1, and performance of the resulting encapsulated lens-type retroreflective sheeting, in Table 2. Said encapsulated lens-type retroreflective sheeting showed a substantial reduction ratio in retroreflective performance and notable peeling of the light-transmitting protective film in severe weatherability tests. Thus a product exhibiting sufficient weatherability could not be obtained.

Comparative Example 3

A retroreflective sheeting was prepared in the identical manner with Example 1, except that the support film was made from a solution of a resin composition which was prepared as follows: 100 parts of a 50% solid acrylic resin solution [an ethyl acetate/toluene solution of an acrylic resin obtained by copolymerizing MMA 34%, EA 61% and HEMA 5% ( Tg: about 10° C., Mw: about 150,000, OH group content: about 0.38 equivalent/kg, shearing stress: $1.5 \times 10^5$ dyne/cm$^2$)] was mixed with 15 parts of titanium dioxide. The resulting acrylic resin solution was further mixed with 33 parts of 15% solid MIBK solution of CAB (same as the one used in Example 1) and 5 parts of a 75% solid HMDI-type crosslinking agent (same as the one used in Example 1) [NCO group/OH group≈1.0 (equivalent ratio)].

The composition and various property values of the resin composition constituting the support film, and the property values of the crosslinked resin are shown in Table 1, and performance of the resulting encapsulated lens-type retroreflective sheeting, in Table 2. Said encapsulated lens-type retroreflective sheeting showed a substantial reduction ratio in retroreflective performance and notable peeling of the light-transmitting protective film in severe weatherability tests. Thus a product exhibiting sufficient weatherability could not be obtained.

Comparative Example 4

A retroreflective sheeting was prepared in the identical manner with Example 1, except that the support film onto which the glass beads were transferred was aged for 20 days at room temperature to substantially complete crosslinking of the support film, and that the surface temperature of the metal roll was made about 190° C. in the later thermofusing and forming step.

The composition and various property values of the resin composition constituting the support film, and the property values of the crosslinked resin are shown in Table 1, and performance of the resulting encapsulated lens-type retroreflective sheeting, in Table 2. Said encapsulated lens-type retroreflective sheeting showed a substantial reduction ratio in retroreflective performance and notable peeling of the light-transmitting protective film in severe weatherability tests. Thus product exhibiting sufficient weatherability could not be obtained.

Comparative Example 5

A retroreflective sheeting was prepared in the identical manner with Example 1, except the following points: an about 60 μm-thick support film which was obtained by applying onto the PET film a support film-forming solution of a resin composition prepared by mixing 100 parts of a 30% solid acrylic resin solution [an ethyl acetate/toluene solution of an acrylic resin formed from copolymerization of MMA 55% and EA 45% (Tg: about 30° C., Mw: about 40,000, OH group content: 0 equivalent/kg, shearing stress: 8.3×10⁴ dyne/cm²)] with 9.4 parts of titanium dioxide, and further mixing the resulting acrylic resin solution with 5 parts of 1.6-hexanediol diacrylate (HDDA) and 0.15 part of stearic acid, and drying the same (shearing stress of the support film: 8.3×10⁴ dyne/cm²); as the light-transmitting protective film, an about 75 μm-thick, unstretched acrylic film having a total light transmittance of about 93% was used; the surface temperature of the metal roll having reticulated ridge portions was made about 150° C. at the time of partial thermofusing and forming step; and crosslinkage of the support film was substantially completed by irradiating the film after the partial thermoforming with 190 kV electronic rays at a dosage of 1.5 Mrad.

The composition and various property values of the resin composition constituting the support film, and the property values of the crosslinked resin are shown in Table 1, and performance of the resulting encapsulated lens-type retroreflective sheeting, in Table 2. Said encapsulated lens-type retroreflective sheeting showed a substantial reduction ratio in retroreflective performance and notable peeling of the light-transmitting protective film in severe weatherability tests. Thus a product exhibiting sufficient weatherability could not be obtained.

TABLE 1

Resin composition

Thermofusible resin

| Item Exp. No. | resin composition (wt %) | | | functional group (equivalent/kg) | Tg (°C.) | molecular weight | shearing stress (180° C.) (dyne/cm²) |
|---|---|---|---|---|---|---|---|
| | MMA | E A | HEMA | | | | |
| Example 1 | 34 | 61 | 5 | 0.38 | 10 | 40,000 | 6.5 × 10⁴ |
| Example 2 | 22 | 63 | 15 | 1.15 | 5 | 70,000 | 7.7 × 10⁴ |
| Example 3 | 34 | 61 | 5 | 0.38 | 10 | 40,000 | 6.5 × 10⁴ |
| Example 4 | 34 | 61 | 5 | 0.38 | 10 | 40,000 | 6.5 × 10⁴ |
| Comparative Example 1 | 25 | 70 | 5 | 0.38 | 0 | 20,000 | 8.5 × 10³ |
| Comparative Example 2 | 40 | 55 | 5 | 0.38 | 16 | 40,000 | 8.4 × 10⁴ |
| Comparative Example 3 | 34 | 61 | 5 | 0.38 | 10 | 150,000 | 1.5 × 10⁵ |
| Comparative Example 4 | 34 | 61 | 5 | 0.38 | 10 | 40,000 | 1.2 × 10⁷ |
| Comparative Example 5 | 55 | 45 | 0 | 0 | 30 | 40,000 | 8.3 × 10⁴ |

| Item Exp. No. | Crosslinking agent | | Cellulose derivative | | Titanium dioxide amount (wt part) | MI Value (g/10 min.) |
|---|---|---|---|---|---|---|
| | kind | amount (NCO/OH) (equivalent ratio) | kind | amount (wt part) | | |
| Example 1 | SUMIDUR N | 1.0 | CAB | 9.9 | 30 | 1300 |
| Example 2 | SUMIDUR N | 0.9 | CAB | 9.9 | 30 | 1100 |
| Example 3 | SUMIDUR N | 1.0 | CAB | 9.9 | 30 | 1300 |
| Example 4 | SUMIDUR N | 1.0 | CAB | 9.9 | 30 | 1300 |
| Comparative Example 1 | SUMIDUR N | 1.0 | CAB | 9.9 | 30 | 5000 |
| Comparative Example 2 | SUMIDUR N | 0.35 | — | — | 75 | 1500 |
| Comparative Example 3 | SUMIDUR N | 1.0 | CAB | 9.9 | 30 | 100 |
| Comparative Example 4 | SUMIDUR N | 1.0 | CAB | 9.9 | 30 | 1> |
| Comparative Example 5 | HDDA | — | — | — | 31 | 1500 |

TABLE 2

| Item Exp. No. | Crosslinked resin | | | Weatherability test | | | | peeled length of protective film (mm) |
|---|---|---|---|---|---|---|---|---|
| | shearing stress (180° C.) (dyne/cm$^2$) | tensile strength (70° C.) (kg/cm$^2$) | elongation-at-break (0° C.) (%) | reflective performance | | | shrinkage length (mm) | |
| | | | | before the test (cd/lx · m$^2$) | after the test (cd/lx · m$^2$) | reduction ratio (%) | | |
| Example 1 | $1.2 \times 10^7$ | 38 | 36 | 340 | 340 | 0 | 0 | 0 |
| Example 2 | $1.4 \times 10^7$ | 114 | 22 | 330 | 320 | 3 | 0.5 | 0 |
| Example 3 | $1.2 \times 10^7$ | 38 | 36 | 350 | 340 | 3 | 0 | 0 |
| Example 4 | $1.2 \times 10^7$ | 38 | 36 | 350 | 340 | 3 | 0 | 0 |
| Comparative Example 1 | $9.5 \times 10^6$ | 19 | 63 | 320 | 270 | 16 | 2 | 2 |
| Comparative Example 2 | $9.4 \times 10^5$ | 18 | 12 | 310 | 250 | 19 | 2 | 3 |
| Comparative Example 3 | $1.3 \times 10^7$ | 43 | 31 | 310 | 240 | 23 | 3 | 3 |
| Comparative Example 4 | $1.2 \times 10^7$ | 37 | 36 | 300 | 230 | 23 | 3 | 4 |
| Comparative Example 5 | $9.2 \times 10^5$ | 12 | 9 | 320 | 250 | 22 | 2 | 2 |

The methods of measurements employed in the test items listed in Table 1 and Table 2 are as follows.

(1) Weatherability test

A retroreflective sheeting to be tested was cut to a size 50 mm×50 mm, from which the silicone-treated PET release film was stripped away. The sheeting was stuck on an aluminum panel, and placed in an accelerated weatherability tester, Suga Shikenki K. K. "Photo-control Weather-O-Meter", and subjected to 500 hours' accelerated weatherability test. Then the stuck test specimen was withdrawn and subjected to a thermal shock test in a cold-heat cycle tester, TABAI ESPEC Co., "Heat Shock Chamber TSR-63" in which one cycle consisting of the following steps was repeated 300 times:

conditions of the cold-heat cycle;

−40° C.×30 min.→room temp.×15 min.

→145° C.×30 min.→room temp.×15 min.

(Measured items)

(1-1) Reduction ratio in reflective performance (%)

Using the following measuring device, retroreflective performance of the test specimen before and after the weatherability test were measured, and the reduction ratio in reflective performance was calculated by the equation below:

Reduction in reflective performance (%) =

$$100 - \frac{\text{retroreflective performance after weatherability test}}{\text{retroreflective performance before weatherablility test}} \times 100$$

Retroreflective performance-measuring device: Advanced Retro Technology, INC., "MODEL 920"

As the angular conditions, an angle of observation of 0.2° and an angle of incidence of 5° were adopted.

(1-2) Shrinkage length (mm)

The shrinkage length of the light-transmitting protective film after the weatherability test was measured from the edge to the location of the maximum shrinkage, and the measured length was recorded as the shrunk length.

(1-3) Peeled length of protective film (ram)

The part of the test specimen in which the bonds between the light-transmitting protective film and the support film were destroyed after the weatherability test was measured by the length from the edge to the location of the longest destroyed portion. The measured length was recorded as the peeled length of peeled protective film.

As has been described in the above, an important characteristic feature of the capsule type retroreflective sheeting in accordance with the present invention resides in the use, as the support film, of the one composed of a resin composition which comprises a thermofusible resin having a shearing stress before crosslinkage which is extremely low compared to that of those conventionally employed, and a crosslinking agent. Whereby the support film can form the connecting walls of uniform structure and uniform shape, in the occasion of partially thermofusing and thermoforming said support film to form the connecting walls to partially connect the light-transmitting protective film and the support film, while leaving spaces between said two films. Furthermore, said support film forms, after the formation of connecting walls, a non-fusible crosslinked resin as its crosslinking reaction progresses, to come to have a strength comparable with, or superior to, that of conventional products, improving the strength of the connecting walls per se. Thus, capsule type retroreflective sheetings having excellent weatherability even under severe conditions of use are obtained.

What is claimed is:

1. In a capsular retroreflective sheeting which contains a light-transmitting protective film, a support film and connecting walls which partially connect the two films to form sealed cells therebetween, and wherein said cells have disposed therein retroreflective elements and further wherein said connecting walls are formed by thermoforming said support film, the improvement comprising as said support film a film comprising a resin composition containing a thermofusible resin having functional groups which are reactable with crosslinking agent and a shearing stress at 180° C. within a range of $9\times10^3$ to $1\times10^5$ dyne/cm$^2$ and a crosslinking agent, said resin composition being capable of forming after the crosslinking reaction a non-fusible, crosslinked resin having a shearing stress at 180° C. of at least $1\times10^6$ dyne/cm$^2$.

2. A retroreflective sheeting according to claim 1, in which the shearing stress of the thermofusible resin at 180° C. is within a range of $9.5 \times 10^3$–$9.5 \times 10^4$ dyne/cm².

3. A retroreflective sheeting according to claim 1, in which the functional groups are active hydrogen-containing functional groups.

4. A retroreflective sheeting according to claim 1, in which the content of the functional groups is 0.1–5 equivalents per kilogram of the thermofusible resin.

5. A retroreflective sheeting according to claim 1, in which the thermofusible resin comprises at least one resin selected from the group consisting of acrylic resin, polyurethane resin, silicone resin, polyester resin, fluorine-containing resin, vinyl acetate resin, vinyl chloride resin, polyolefin resin and polyamide resin.

6. A retroreflective sheeting according to claim 1, in which the thermofusible resin is composed of acrylic resin.

7. A retroreflective sheeting according to claim 6, in which the acrylic resin has a glass transition temperature within a range of –30° to 50° C.

8. A retroreflective sheeting according to claim 6, in which the acrylic resin has a weight average molecular weight within a range of 10,000 to 200,000.

9. A retroreflective sheeting according to claim 1, in which the crosslinking agent is at least one member selected from the group consisting of polyisocyanate compound, polyaziridine compound, polyepoxy compound and amino resin.

10. A retroreflective sheeting according to claim 1, in which the crosslinking agent is a polyisocyanate compound.

11. A retroreflective sheeting according to claim 1, in which the thermofusible resin comprises acrylic resin having active hydrogen-containing functional groups and the crosslinking agent is a polyisocyanate compound.

12. A retroreflective sheeting according to claim 1, in which the resin composition contains the crosslinking agent at a ratio of 0.25–1.5 equivalents per equivalent of the functional groups in the thermofusible resin.

13. A retroreflective sheeting according to claim 3, in which the active hydrogen-containing functional groups are hydroxyl groups.

14. A capsule type retroreflective sheeting according to claim 10, in which the polyisocyanate compound is selected from aliphatic polyisocyanates, alicyclic polyisocyanates, dimers or trimers of these polyisocyanates and adducts of these isocyanates with divalent or trivalent polyols.

15. A retroreflective sheeting according to claim 1, in which the resin composition further contains a cellulose derivative.

16. A retroreflective sheeting according to claim 15, in which the resin composition contains a cellulose derivative within a range of 1–40 parts by weight per 100 parts by weight of the thermofusible resin.

17. A retroreflective sheeting according to claim 15, in which the cellulose derivative has a glass transition temperature (Tg) not lower than 90° C.

18. A retroreflective sheeting according to claim 15, in which the cellulose derivative has a number average molecular weight of no less than 15,000.

19. A retroreflective sheeting according to claim 1, in which the resin composition has a melt index within a range of 800–4,000 g/10 minutes before the crosslinking reaction.

20. A retroreflective sheeting according to claim 1, in which the crosslinked resin has a shearing stress at 180° C. of at least $2 \times 10^6$ dyne/cm².

21. A retroreflective sheeting according to claim 1, in which the crosslinked resin has a tensile strength at 70° C. of at least 10 kg/cm¹.

22. A retroreflective sheeting according to claim 1, in which the crosslinked resin has an elongation-at-break at 0° C. of at least 5%.

23. A retroreflective sheeting according to claim 1, in which the protective film is an acrylic resin film or fluorine-containing resin film.

24. In a retroreflective sheeting containing a plurality of hermetically sealed small compartment cells having disposed therein retroreflective elements, wherein said cells are defined by a light-transmitting protective film, a support film, and connecting walls extending therebetween, wherein the connecting walls are thermoformed from the support film, the improvement comprising said support film and said connecting walls being formed from a composition comprising a thermofusible resin having functional groups and a shearing stress at 180° C. within a range of from $9 \times 10^3$ to $1 \times 10^5$ dyne/cm², and a crosslinking agent reactable with the functional groups of the thermofusible resin and, wherein the thermofusible resin is cured, to a non-fusible, crosslinked resin having a shearing stress at 180° C. in the range of from $1 \times 10^6$ to $3 \times 10^7$ dyne/cm².

25. The retroreflective sheeting of claim 24 wherein the thermofusible resin has a shearing stress, at 180° C., within a range of $9.5 \times 10^3$ to $9.5 \times 10^4$ dyne/cm² and wherein the non-fusible crosslinked resin has a shearing stress, at 180° C., within a range of $3 \times 10^6$ to $3 \times 10^7$ dyne/cm².

\* \* \* \* \*